No. 663,303. Patented Dec. 4, 1900.
C. A. SUTTON.
SCRAPER.
(Application filed Aug. 14, 1900.)
(No Model.)
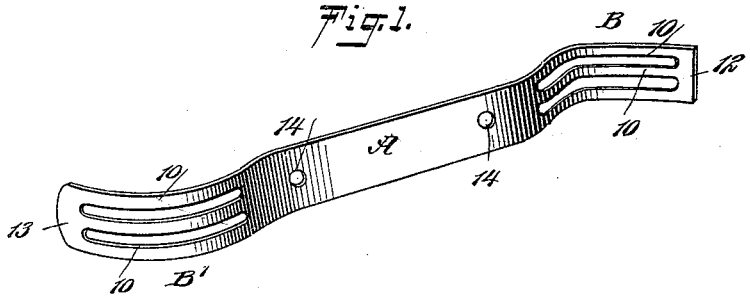
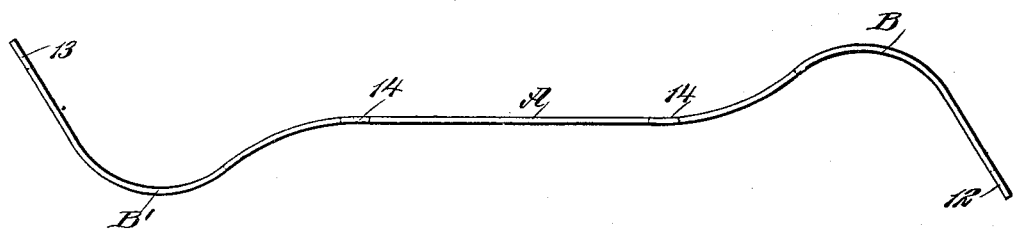
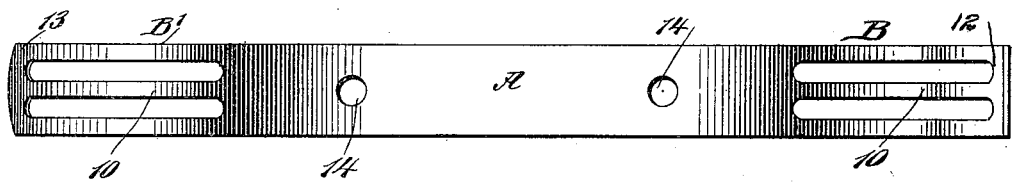
WITNESSES:
William P. Goebel.
[signature]
INVENTOR
Charles A. Sutton.
BY [signature]
ATTORNEYS
THE NORRIS PETERS CO., PHOTO-LITHO., WASHINGTON, D. C.

UNITED STATES PATENT OFFICE.

CHARLES A. SUTTON, OF PITKIN, COLORADO.

SCRAPER.

SPECIFICATION forming part of Letters Patent No. 663,303, dated December 4, 1900.

Application filed August 14, 1900. Serial No. 26,879. (No model.)

*To all whom it may concern:*

Be it known that I, CHARLES A. SUTTON, a citizen of the United States, and a resident of Pitkin, in the county of Gunnison and State of Colorado, have invented a new and Improved Scraper, of which the following is a full, clear, and exact description.

One purpose of this invention is to provide an efficient, simple, and durable one-piece scraper having a multiple of scraping-surfaces which may be readily restored to good condition when worn, and to so shape the article and arrange its scraping-surfaces that the scraper may be conveniently applied to and will thoroughly remove all extraneous matter that may collect on pots, pans, kettles, and their handles, no matter what shape the bodies or handles of the vessels may be.

Another purpose of the invention is to so construct the scraper that convexed, concaved, or undulating surfaces may be cleaned as readily as straight or flat surfaces and all corners conveniently reached and cleared of any accumulation of matter, and, furthermore, to provide a scraper which may be used as a crumb-collector or for cleaning or scraping floors, wainscoting, or the like, bread or cake boards, or the surfaces of stoves or ranges.

Another purpose of the invention is to so construct the scraper that it will not cut or scratch and so that any edge thereof may be conveniently brought into service as a scraping or cleaning edge.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved scraper. Fig. 2 is an edge view thereof, and Fig. 3 is a plan view of the improved scraper.

The scraper is made of any material that will retain its shape; but metal—for example, steel—is preferred.

The scraper is constructed from a single piece of material of desired dimensions and comprises a straight body A and two end sections B and B', curved in opposite directions from the body. Each body-section B and B' comprises a series of tines, said tines at the end B being connected at their outer ends by a cross-bar 12, while the tines of the end section B' are similarly connected by a cross-bar 13. The outer edge of the cross-bar 13 is convexed or rounded, while the outer end of the cross-bar 12 is straight.

The longitudinal edges of the body A are straight, forming two scraping-surfaces at each longitudinal edge of said body, and the longitudinal edges of the tines 10 are also straight, so that front and back scraping-surfaces are formed at each longitudinal outline of each tine, thus providing at each end of the device a multiple of scraping-surfaces. The spaces between the tines permit the material removed by the scraping action of the implement to readily escape, so that said tines will not become clogged. The edges at each end of the device have likewise two scraping-surfaces, one at the front and the other at the back portion of the device. The cross-bars 12 and 13, connecting the tines, hold said tines against undue flexibility.

The rounded or convexed end portion of the device is adapted to clean the bowls of spoons or the hollow portions of handles, and the square end of the device will enter and clean out corners. The bent or curved sections B and B' are specially adapted for application to rounded bottoms or the bulging sides of vessels, and the two ends of the scraper are curved in opposite directions for convenience in applying the device to various purposes. By constructing the end portions of the device after the manner of tines a multiple of scraping-surfaces is obtained in the width of the strip of material from which the device is made, and said curved sections B and B' are those which are most often brought into service, as they are best adapted for ordinary use.

The body-section A of the scraper is usually provided with apertures 14 to facilitate hanging the scraper on a nail or a like support. Should the cutting edges of the scraper become rounded from wear, they may be readily restored by filing them.

It will be understood that hot water can be used in utensils to be scraped, thereby greatly facilitating the work.

Having thus described my invention, I claim as new and desire to secure by Letters Patent—

1. As an improved article of manufacture, a scraper consisting of a metal strip comprising a plain body and a curved end section, which curved end section consists of series of tines continuous with the body, and a cross-bar connecting the outer ends of the tines, all longitudinal edges of the tines and body being scraping edges, and the end of the cross-bar having likewise scraping edges or surfaces, whereby a multiple of scraping-surfaces is obtained and a clearance of material scraped from a surface is insured at the curved section of the device.

2. As an improved article of manufacture, a scraper comprising a straight body and end sections curved from the body in opposite directions, each end section consisting of a series of tines continuous with the body, and cross-bars connecting the ends of the tines, one cross-bar having a convexed outline at its extremity, the corresponding outline of the other cross-bar being straight, and all longitudinal edges on the entire device being scraping edges as well as the edges of the cross-bars, and whereby also the scraper may be effectively used upon surfaces of varying character and upon all manner of utensils, for the purpose specified.

In testimony whereof I have signed my name to this specification in the presence of two subscribing witnesses.

CHARLES A. SUTTON.

Witnesses:
   CHARLES W. WINSLOW,
   CHARLES OLIVER.